United States Patent [19]

Rux

[11] Patent Number: 4,512,286
[45] Date of Patent: Apr. 23, 1985

[54] PET SEAT FOR AUTOMOBILES

[76] Inventor: Paul R. Rux, 5125 Mountain View Dr., Las Vegas, Nev. 89102

[21] Appl. No.: 505,768

[22] Filed: Jun. 20, 1983

[51] Int. Cl.³ .................. A01K 3/00; A01K 27/00
[52] U.S. Cl. .................................................. 119/96
[58] Field of Search ............ 119/1, 96; 5/94; 297/250, 254, 485, 255, 256; 224/275, 42.43, 42.45

[56] References Cited

U.S. PATENT DOCUMENTS

| | | | |
|---|---|---|---|
| 1,351,746 | 9/1920 | Eberle | 119/1 |
| 2,224,999 | 12/1940 | Mover | 119/1 |
| 2,568,304 | 9/1951 | Schoenbrun | 119/96 |
| 3,310,034 | 3/1967 | Dishart | 119/96 |
| 3,436,770 | 4/1969 | Turner | 5/94 |
| 3,948,222 | 4/1976 | Longshore et al. | 119/96 |
| 4,010,880 | 3/1977 | Munoz | 119/96 |

FOREIGN PATENT DOCUMENTS 945885  4/1974  Canada ...................... 5/94

Primary Examiner—Hugh R. Chamblee
Attorney, Agent, or Firm—Seiler, Quirk & Tratos

[57] ABSTRACT

A container for small pets mounts on the seat of a vehicle and contains a harness for securing the pet in the container which is fastened to the container by a short leash. The container has a hinged front wall which is movable to a plurality of positions to accommodate various lying, sitting, or standing positions of the pet. The front wall also has a hinged flap at its outward edge which may be folded inwardly adjacent the front wall, or may be forwarded rearwardly over a portion of the top of the container to partially cover the container.

12 Claims, 4 Drawing Figures

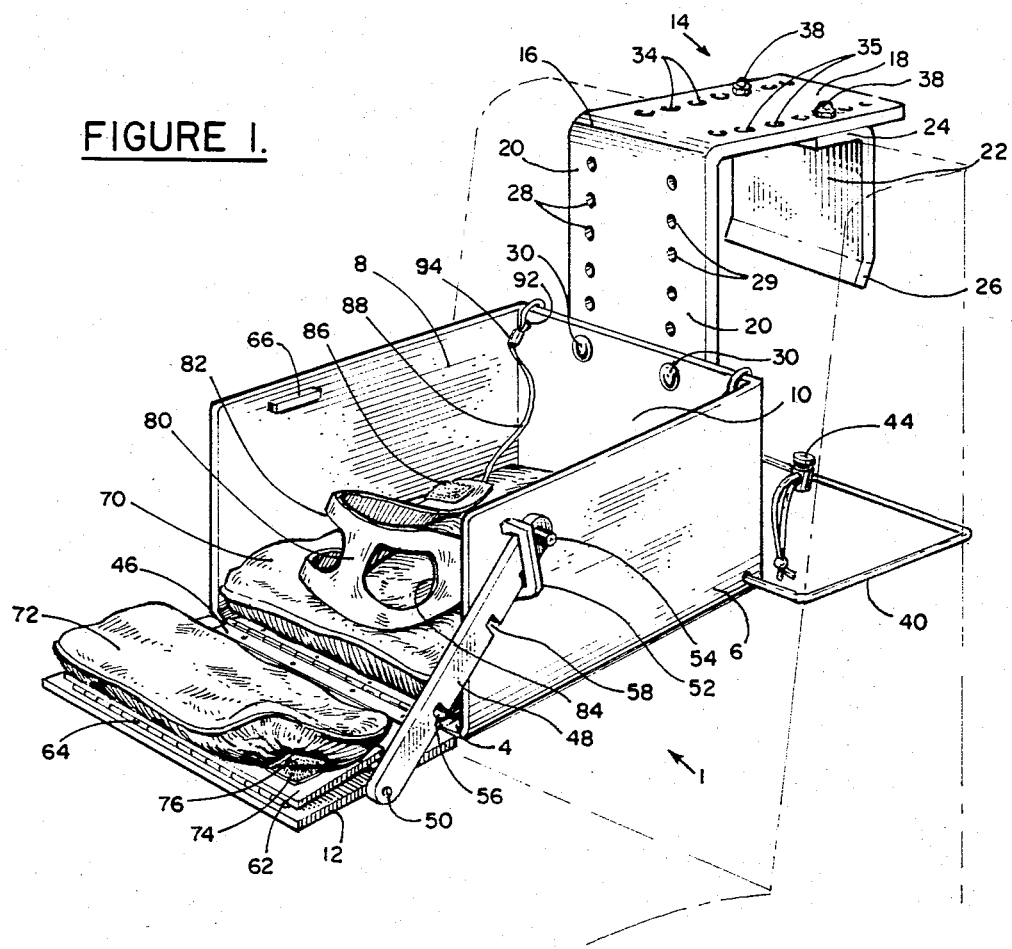

PET SEAT FOR AUTOMOBILES

BACKGROUND OF THE INVENTION

This invention relates to a device for the transportation of pets, such as cats and small dogs, in vehicles. More particularly, it relates to an open container in which a pet may be transported which precludes direct contact of the pet with the car seat, yet permits some mobility and substantial comfort for the pet.

The transportation of small animals in vehicles poses certain problems different from those encountered by the maintenance of pets in the home. Frequently, pet owners will desire to have small pets accompany them on car trips, but have difficulty maintaining the pets under adequate control in the vehicle. Pets will frequently become restless or excitable in a car, and may occasionaly become ill. While most pet owners would prefer not to completely restrain the animal from movement, permitting the pet to roam freely within the vehicle may be distracting and even dangerous to the driver. Accordingly, a number of different restraining devices have been developed which permit a certain amount of movement within the car while still restraining the extent of such movement.

Devices used to restrain animals in a vehicle have generally been of two types. First, safety harnesses have been developed which secure the dog directly to a car seat; these harnesses generally seem more useful for larger animals. For example, Dishart, U.S. Pat. No. 3,310,034, Longshore et al., U.S. Pat. No. 3,948,222, and Friedman, U.S. Pat. No. 4,324,204, show strap-type harnesses which are secured around the dog and which fasten directly to the seat, either by means of straps, ropes, or clip fasteners. These harness mechanisms have a disadvantage of permitting the pet to sit directly on the car seat, thereby exposing the possibility of the seat covering becoming soiled or scratched. A second type of carrier for pets is a basket-type carrier which hangs over the seat back and which is useful for transporting either a pet or a child. The Dishart, U.S. Pat. No. 3,310,034, also discloses a basket-type device in which a pet may be restrained without contacting the seat cover. Other seat mountable pet or child supports are disclosed in Love, U.S. Pat. No. 2,499,103, Russo, U.S. Pat. No. Des. 245,716, Gatling, U.S. Pat. No. 1,435,115, Schiffman, U.S. Pat. No. 2,869,144, and Guillot-Munoz, U.S. Pat. No. 4,010,880. These latter patents all show wall containers having means for fastening the containers to a seat back. The Schiffman patent discloses a padded crib having hinged sides, and the Guillot-Munoz patent discloses a basket having a restraining rope which encircles the pet and attaches to the basket to prevent the pet from leaving the basket.

The present invention provides a pet restraining seat which provides a comfortable, adjustable harness which is fastened to the pet seat yet which provides the ability for the pet to move around within the enclosure. The pet seat is also provided with an adjustable front portion which may be selectively placed in a plurality of configurations to permit the pet to lie down or assume various sitting or resting positions depending upon the preference of the pet or the owner.

Accordingly, it is an object of the present invention to provide a car seat for small pets which precludes contact of the pet with the seat-covering fabric. It is another object of the invention to provide a pet seat which is adjustable to fit virtually any vehicle seat back, and which fastens securely thereto. It is another object of the invention to provide a pet seat having a box-like shape and having a forward wall which is hinged and which has stop means to selectively set the attitude of the front wall into a variety of positions. These and other objects of the invention will be apparent to one skilled in the art from the following detailed description of a preferred embodiment thereof.

BRIEF SUMMARY OF THE INVENTION

A pet container for vehicles comprises an open container having walls, the front wall of which is hingedly fastened near its bottom edge and is movable between horizontal and vertical positions. A panel is hingedly mounted to the front wall at an upper portion of the front wall. When the front wall is in the vertical position, the panel may be selectively oriented in a horizontal position forming a partial cover for a forward portion of the container, or in a vertical (folded) position at the inside of the front wall of the container. The front container wall may also be set at an attitude between horizontal and vertical. The panel and the bottom of the container are provided with removable pillows. An adjustable harness which slips over the pet's front legs attaches to the container to prevent movement of the pet from the container. A mounting bracket which is adjustable to fit a variety of vehicle seats is also provided.

BRIEF DESCRIPTION

The invention is best understood with reference to the drawings, in which:

FIG. 1 is a perspective view of a pet seat of the invention showing the front wall in a fully opened position;

FIG. 2 is a partially cutaway side view of a pet seat showing the front wall in inclined position and also showing a dog strapped into the seat;

DETAILED DESCRIPTION OF A PREFERRED EMBODIMENT

Figure 3:
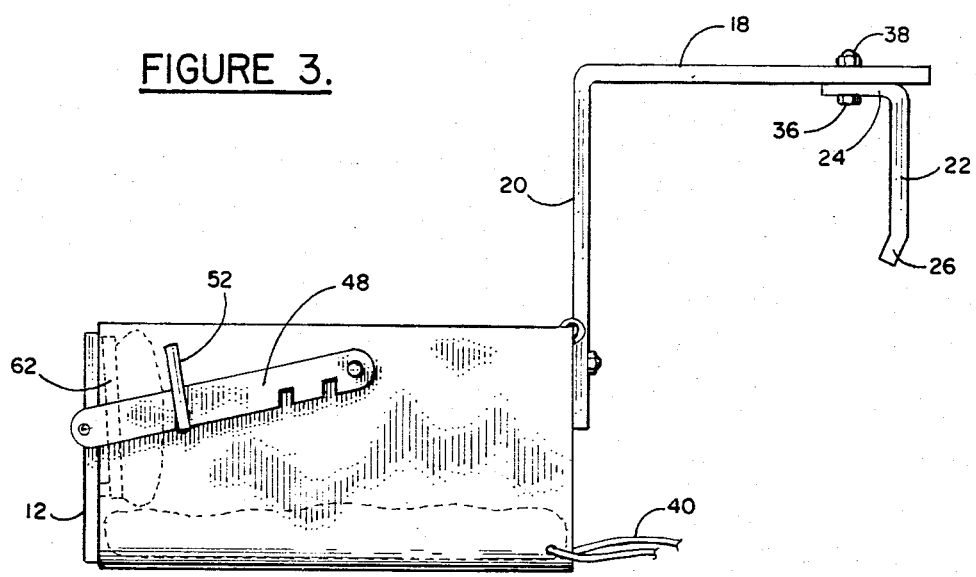
FIG. 3 is a side view of the device showing the forward wall in vertical position.

Referring first to FIG. 1, pet seat 1 comprises a rectangular box-like container 2 having a bottom wall 4, side walls 6 and 8, and a rear wall 10. A front wall 12 consists of a rectangular panel hingedly connected at its bottom edge to the forward portion of bottom wall 4.

As also shown in FIG. 1, the seat is attached to the car seat (shown in phantom) by mounting means 14 which consists of a two-piece bracket. The bracket comprises an L-shaped rigid member 16 having a horizontal flange 18 and a vertical flange 20. The second bracket member is a depending grip member 22 having a horizontal flange 24 and a slightly inwardly angled end portion 26 at its lower portion. The depending grip portion is attached to the L-shaped member by means of bolts 36 and nuts 38 which extend through bores (not shown) in the horizontal flange of the grip member and through corresponding bores in the horizontal flange 18 of the L-shaped bracket member. A series of parallel lines of bores 34 and 35 are provided for adjustment of the bracket to fit various seat back widths. Similar parallel lines of mounting bores 28 and 29 are provided in the vertical flange of the L-shaped bracket member for mounting the container at various heights on the seat. Bolts 30 and nuts 32 (see FIG. 2) are used to fasten the container portion to the mounting bracket.

In some circumstances, the mounting bracket 14 may not be sufficient to provide secure fastening of the pet seat to the seat back. This would be the case, for example, if the seat back had a particularly unusual contour at its upper edge, or if the vehicle were used to travel over particularly bumpy roads which might dislodge the bracket. In this case, additional fastening means consisting of a rope 40 extends through bores 42 in a rear bottom portion of the container. This rope or strap may be tied in a horizontal plane around the back of the seat to provide additional security. In FIGS. 1 and 2, a conventional clip fastener 44 is shown to secure the ends of the strap 40.

The front wall 12 of the container is mounted by means of hinge 46 to the container bottom and is movable between a horizontal position as shown in FIG. 1, and a vertical position, as shown in FIG. 3. The front wall is secured in its desired position by stop means which consists of an arm 48 which is pivotally mounted at one end by mounting pin 50 at approximately the mid-point of the edge of the front wall. The mounting arm extends through the slot portion of C-shaped lug 52 which extends outwardly from side wall 6 of the container. An outwardly extending dowel member 54 serves as a handle for operation of the arm as well as a stop member to prevent the arm from sliding out of the slot in the lug 52. A plurality of U-shaped notches 56, 58, and 60 are cut into the underside of the arm and engage the bottom edge of the C-shaped lug to maintain the front wall in any of several desired positions. As shown in FIG. 1, the arm is fully extended with the notch 58 engaging the lug, thus retaining the forward wall in a horizontal position. As shown in FIG. 2, the intermediate notch 56 engages the lug, thereby retaining the front wall in an angled position between horizontal and vertical. FIG. 3 shows the forward wall maintained in a vertical position by engagement of the forward notch 54 with the lug. If desired, more notches may easily be configured into the arm to provide various other attitudes of the front wall.

Figure 4:
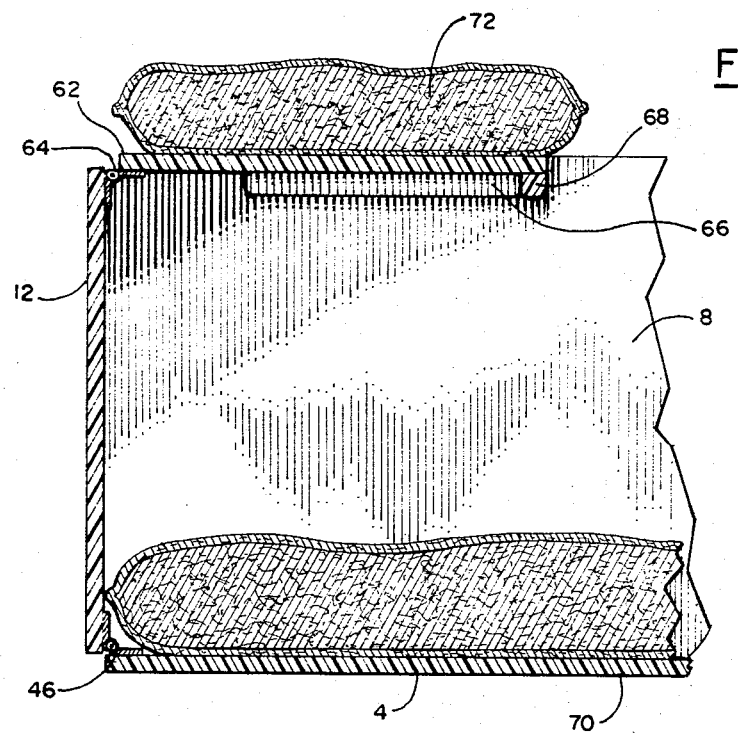
FIG. 4 is a partial section view of the pet seat showing the front wall in vertical position and the rest panel in horizontal position.

Another important feature of the invention is the provision of a separate flap or panel 62 which is hingedly mounted at an upper inner portion of front wall 12 via hinge 64. This panel 62 is of shorter height than the front wall, and may either be retained in a closed, vertical position on the inside of the front wall, as shown in FIG. 3, or maybe extended to form a partial front cover for the container. This latter mode is shown in FIG. 4. This panel is supported by two identical interior ledges or beads 66 which extend partially along the interior surfaces of side walls 6 and 8 of the container. When in horizontal position, the edge portions of the panel 62 rest on and are supported by the ledges 66. A bead 68 extends across the entire outward edge portion of the panel, and engages the rear ends of the ledges 66 as shown in FIG. 4 to assist in preventing lateral motion of the panel. The existence of the bead 68 is optional, since the locking arm 48 also serves to retain the panel from lateral motion.

The container is fitted with a pillow 70, which is coextensive with the container bottom, and a second pillow 72 which is fastened to the rearward surface of panel 62. Pillow 72 is removably attached to the panel by means Velcro strips, which are commercially available hook-and-loop fastening members. A strip 74 of the hook portion of the Velcro fasteners is attached to the panels, and a corresponding strip 76 of the loop portion of the fastener is adhesively attached to the pillow 72. This means of fastening the pillow to the panel provides for easy removal of the pillow for cleaning, while precluding the pillow from sliding away from the panel when the panel is in an elevated position.

FIG. 2 shows a dog 78 restrained in the pet seat by means of a harness 80. The harness is fabricated from a flexible material, such as plastic or leather, and has two openings 82 and 84 to receive the pet's front legs. The straps of the harness extend over the dog's back, and are fastened by means of another set of the aforementioned Velcro fasteners. This fastening method, which is conventional, permits the harness to be used for dogs of different sizes. A pair of straps 88 and 90 extend from the harness and are looped through a set of bores 92 in the rear wall of the seat. The ends of the straps are fastened by metal clip fasteners 94.

The pet seat of the invention is easily installed by simply sliding the mounting bracket 14 over the upper portion of the car seat after the appropriate adjustments for seat thickness and desired height are made. The strap 40 is then tied around the back of the car seat for additional security. The pet is then strapped into the harness 80 by inserting the front legs of the dog through the openings in the harness, and the harness is then fastened around the dog's back. The forward portion of the carrier is then set into the desired position by sliding the locking arm 48 to the desired location and engaging the appropriate notch with lug 52. With the front wall fully extended, as shown in FIG. 1, the pet is able to move forward and lie down in a fully extended position. With the front wall in a partially extended or angled position, the pet may use the forward portion of the seat as a rest or pillow. In the configuration shown in FIG. 4, it is very common for a pet to put his front feet up on pillow 72, thereby using the front panel as a step and enabling the pet to stretch and look out the window.

It should be understood that many modifications and variations may be made to the pet seat of the invention within the spirit and scope of the invention. Accordingly, the invention should not be limited by the description of the foregoing preferred embodiment thereof, but rather should be considered limited only by the following claims.

I claim:

1. A container for supporting a pet in a vehicle comprises a bottom wall, side walls, and a normally open top,
    a front wall hingedly attached at a lower portion thereof to the container and movable between a first substantially horizontal position and a second position,
    stop means for selectively retaining said wall in any of said first position, said second position, and at least one position therebetween,
    mounting means for fastening the container to a seat of a vehicle, and
    restraining means for securing an animal to prevent the animal from leaving the container.

2. The container of claim 1 wherein the front wall is hingedly attached to the bottom wall.

3. The container of claim 1 wherein the second position is substantially vertical.

4. The container of claim 1 wherein the first portion is substantially horizontal and the second position is substantially vertical.

5. The container of claim 1 wherein said front wall also comprises a flap portion hingedly connected to the front wall.

6. The container of claim 1 wherein the restraining means comprises a harness, and at least one flexible connector extending from the harness to the container.

7. The container of claim 6 wherein the harness comprises a flat, flexible member having a pair of openings therein to receive the front legs of an animal, and releasable fastening means for attaching the harness to the body of an animal.

8. The container of claim 7 wherein the releasable fastening means comprises interengaging fastening means attached to two separate positions of the harness.

9. The container of claim 8 wherein the interengaging fastening means comprises hook and loop fasteners.

10. A container for supporting a pet in a vehicle comprises a bottom wall, side walls, and a normally open top,
 a front wall hingedly attached at a lower portion thereof to the container and movable between a first substantially horizontal position and a second position,
 stop means for selectively retaining said wall in said second position,
 mounting means for fastening the container to a seat of a vehicle,
 restraining means for securing an animal to prevent the animal from leaving the container, and
 a flap portion hingedly connected to the front wall and movable between a retracted position in which it is folded inwardly adjacent the front wall, and an extended position in which it extends rearwardly and horizontally from the front wall over the top of the container.

11. The container of claim 10 also comprising support means for retaining the flap portion in the extended position.

12. The container of claim 10 comprising an arm pivotally mounted to the front wall and extending rearwardly therefrom, said arm having a plurality of notches along its length, and notch-engaging means attached to a container wall for arresting the arm at various positions along its length.

* * * * *